(12) United States Patent
Lejonberg

(10) Patent No.: US 6,339,263 B1
(45) Date of Patent: Jan. 15, 2002

(54) PLANT FOR FEEDING ALTERNATING VOLTAGE WITH REDUCED LOSSES

(75) Inventor: Tommy Lejonberg, Västerås (SE)

(73) Assignee: Balfour Beatty plc, London (GB)

( * ) Notice: Subject to any disclaimer, the term of this patent is extended or adjusted under 35 U.S.C. 154(b) by 0 days.

(21) Appl. No.: 09/445,151
(22) PCT Filed: May 26, 1998
(86) PCT No.: PCT/SE98/00976
  § 371 Date: Feb. 14, 2000
  § 102(e) Date: Feb. 14, 2000
(87) PCT Pub. No.: WO98/55339
  PCT Pub. Date: Dec. 10, 1998

(30) Foreign Application Priority Data

Jun. 4, 1997 (SE) ................................................. 9702129

(51) Int. Cl.[7] .............................. H02J 1/00; H02J 3/00
(52) U.S. Cl. ........................................................ 307/82
(58) Field of Search ............................. 307/82, 66, 18, 307/22, 38

(56) References Cited

U.S. PATENT DOCUMENTS 5,477,091 A  12/1995  Fiorina et al.

FOREIGN PATENT DOCUMENTS

JP  61-285145  12/1986
JP  1-160745  6/1989

*Primary Examiner*—Edward H. Tso
(74) *Attorney, Agent, or Firm*—Connolly Bove Lodge & Hutz LLP

(57) ABSTRACT

A plant for feeding alternative voltage between places located remotely through a long first line includes a feeding arrangement for feeding electric power to the first line. This arrangement has a second line conducting direct voltage and adapted to extend along the first line, and inverters arranged at locations along the extension of the lines. The inverters are connected between the direct voltage line and the alternating voltage line for converting direct voltage into alternating voltage which is fed to the first line.

12 Claims, 1 Drawing Sheet

PLANT FOR FEEDING ALTERNATING VOLTAGE WITH REDUCED LOSSES

FIELD OF THE INVENTION AND PRIOR ART

The present invention relates to a plant for feeding alternating voltage between places remotely located through a long first line, which comprises a feeding arrangement for feeding electric power to the first line.

The invention comprises all types of such plants, such as for example for transmitting alternating voltage through high voltage lines over long distances from places where it is generated to consumer networks. "Places located remotely" and "long first line" mean that the distance is at least in the order of kilometres, but lines of this type extend in practice over hundreds of kilometres.

In order to illuminate the invention and the problem to be solved thereby the case of such a plant for a line for feeding alternating voltage to railway vehicles will hereinafter be described, although the invention, accordingly, is not at all restricted to this field of use, but the corresponding problem is also there in other possible fields of use of the invention.

In such plants in so-called railway supply a one-phase alternating voltage is fed to railway vehicles through said first line, and since the first line has a comparatively high impedance, both resistance and reactance, the power possible to transmit to the railway vehicles along the first line will be restricted as a consequence of the phase shift between the current and the voltage, voltage drops over the line and losses in the line.

Different solutions have been suggested for solving this problem with a limited transmittable power from the first line, which aim at reducing the impedance in the first line. Among these, lines with double supply and arrangement of different types of reinforcement lines running in parallel with the first line constituting the contact line may be mentioned. Another way to attack this problem is to arrange alternating voltage transmission systems in parallel with a higher voltage than the voltage of the first line. This means that the voltage is step-up transformed to a higher level and led in parallel with the first line, which means considerably lower losses, in which the voltage may for example be step-up transformed from about 16 kv in the first line to 130 kV in the parallel line. The voltage is then step-down transformed at different locations along the first line for feeding thereof. Completely separate high voltage transmission lines may so be used with a connection to the first line through transformers uniformly distributed or a use of autotransformer systems may take place. One of the disadvantages of this solution is the requirement of expensive transformers. All these solutions are comparatively costly.

SUMMARY OF THE INVENTION

The object of the present invention is to provide a plant of the type defined in the introduction, which enables an achievement of a good ability to transmit electric power from the first line to loads therealong in a simpler and by that less expensive way than through the plants already known discussed above.

This object is according to the invention obtained by providing said arrangement with a second line conducting direct voltage and adapted to extend along the first line and inverters arranged at locations along the extension of the lines and connected between the direct voltage line and the alternating voltage line for converting direct voltage into alternating voltage fed therethrough to the first line.

The feeding of electric power between different locations along the first line may by providing the feeding arrangement with a line conducting direct voltage take place through a direct current which will only feel the resistive part of the second line and the impedance and the voltage drop over the line will by that be lower. Furthermore, the current in the direct voltage line may without any problem be considerably lower than in direct transmission over the first line, since a considerably higher, namely $2\sqrt{2}$ times, direct voltage may be transmitted on the direct voltage line than the voltage level desired to be obtained on the first line without any need of any transformer for reducing the voltage to the level desired between the inverter and the first line. This will result in a substantially increased transmission capacity and reduced losses.

According to another preferred embodiment of the invention the feeding arrangement comprises a third line conducting alternating voltage and led to the first line for feeding electric power to the first line, and a rectifier is connected between the third and the second line. A supply line conducting alternating voltage and emanating from a source for generation of electric power may by this in the plant according to the invention in a conventional way be led to the first line for feeding power thereto, in which, however, a rectifying takes place through the rectifier for being able to provide an alternating voltage of a different type through an inverter, primarily with respect to the number of phases and the frequency, to the first line, in which the direct voltage produced by the rectifier of the second line conducting direct voltage here is utilised for a direct voltage transmission in the second line to locations where inverters are arranged and may transfer electric power to the first line.

According to another preferred embodiment of the invention the feeding arrangement comprises a converter with a rectifier connected to the third line, an inverter connected to the first line and an intermediate link arranged therebetween, and the second line is connected to the intermediate link for feeding direct voltage along the first line. By in principle prolonging the direct voltage line present between a rectifier and an inverter in a conventional converter in this way a simple way to transmit electric power along a line for feeding alternating voltage is obtained while maintaining a good transmitting capacity from the first line to possible loads and low losses along the very line.

According to another preferred embodiment of the invention the first line is a contact line for feeding one-phase alternating voltage to railway vehicles. The invention is particularly well suited for this application, in which it is important that sufficient power may be transferred to such a vehicle at different locations along the contact line.

According to another preferred embodiment of the invention the connection between said inverter and the first line has no transformer, which keeps the costs for the plant on a low level and still enables a comparatively weak current with small losses in the second direct voltage transmission line.

According to another preferred embodiment of the invention the inverter is a three-level inverter, i.e. an inverter having a neutral point, whereby a better curve shape is obtained for the alternating voltage provided to the first line by the inverter.

It is pointed out that the claim definitions "rectifier" and "inverter" are to be given a broad sense and mean that in the direction intended, such as from the third line to the second line, a transition from alternating voltage to direct voltage and from direct voltage to alternating voltage, respectively, takes place, but this does not exclude the possibility to transmit power through these components in the opposite direction, so that these then function as inverter and rectifier, respectively, instead, which will be the case when a railway vehicle will brake.

Further advantages as well as advantageous features of the invention will appear from the following description and the other dependent claims.

BRIEF DESCRIPTION OF THE DRAWING

With reference to the appended drawing, below follows a description of preferred embodiments of the invention cited as examples.

In the drawing.

DETAILED DESCRIPTION OF PREFERRED EMBODIMENTS OF THE INVENTION

Figure 1:
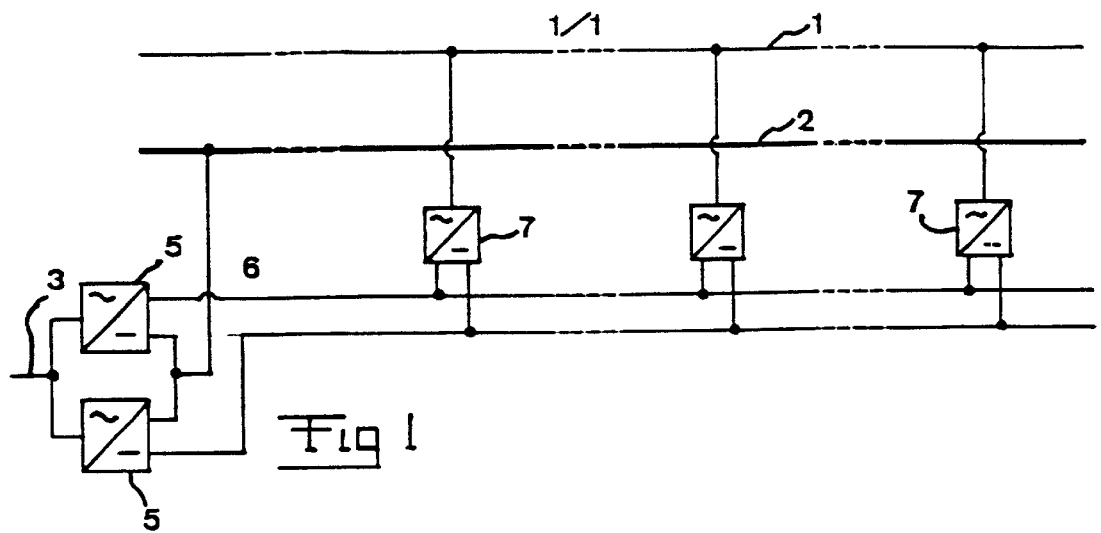
FIG. 1 shows a schematic block diagram illustrating how a plant according to the invention according to a first preferred embodiment of the invention may look like, FIG. 2 is a more detailed view of a part of the plant according to FIG. 1.

The principles of a plant according to the invention, which here is shown in the form of a plant for feeding alternating voltage to railway vehicles, are schematically illustrated in FIG. 1. This plant has a first line 1 in the form of a so-called contact line for feeding railway vehicles by a one-phase alternating voltage, which typically may have an effective value of for example 16 kV and a frequency of 16⅔ Hz. The line 1 hangs at a suitable distance above the railway 2. The line 1 has a considerable impedance, usually about 0,3 Ω/km, which has an inductive and a resistive part.

The plant has also a third line 3, which here leads a three-phase alternating voltage (another number of phases is also possible) and is arranged to supply the contact line with electric power. The third line 3 is connected through a transformer 4 (see FIG. 2) for step-down transforming the high voltage on the line 3 from for example 200 kV to 16 kV to the input of each of two rectifiers 5 connected in series, schematically indicated and adapted to convert alternating voltage into a direct voltage. One respective of two pole lines of the second line 6 conducting direct voltage are connected to the outputs of the rectifier, and this direct voltage line is arranged to extend along the contact line 1. The midpoint of the rectifier outputs is connected to the rail 2. At different locations along the direct voltage line 6 and by that the contact line 1 inverters 7 are arranged between the direct voltage line and the contact line for transmitting alternating voltage and current to the contact line at these locations. The advantages of arranging the direct voltage line 6 along the contact line in this way for transmitting through the direct voltage line over the longer distances over which the contact line extends have been thoroughly discussed above.

Figure 2:
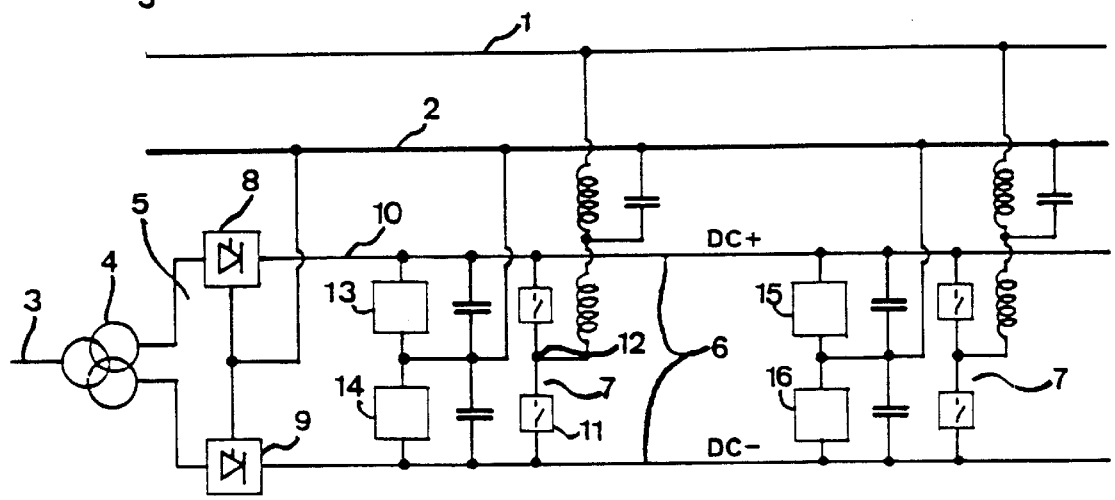

More details of the plant according to the invention will now be described with reference to FIG. 2. The rectifier 5 consists, as mentioned, of two halves 8, 9, and the midpoint therebetween is connected to the rail 2. Both halves 8 and 9 of the rectifier are made of so-called valves having a number of rectifying semi-conductor components connected in series. This is conventional technique. An intermediate link is connected to the output of the rectifier and is formed by capacitors and inductance coils. Harmonic or overtone filters 13–16 are formed in this way for eliminating power pulsations of the one-phase side. Each inverter 7 consists in conventional way of two electronic switches 11, which connect the phase outlet 12 either to plus or to minus. The electronic switches are in practice constituted by a number of semi-conductor components of turn-off type, such as IGsTs, connected in series and a diode connected in anti-parallel with each of them. The phase outlet 12 is connected to the contact line 1 through a LCL-filter, i.e. two inductors and one capacitor and accordingly without any intermediate transformer.

Since the voltage of the intermediate link 10 has to be higher than the peak-to-peak value for the alternating voltage to be generated to the contact line, for example in the case of a voltage in the contact line of 16,5 kv in the case of a Swedish system a voltage on the intermediate link of at least $2\sqrt{2} \times 16,5$ kV=46,7 kV has to be used. This means in its turn that the current will be at least 2,8 times lower in the line 6 than in direct transmission from the contact line and in addition a direct current, which means that it is only the resistive part of the direct voltage intermediate link that gives rise to the voltage drop. This means, as declared above, a substantially increased transmission capacity and reduced losses.

Figure 3:
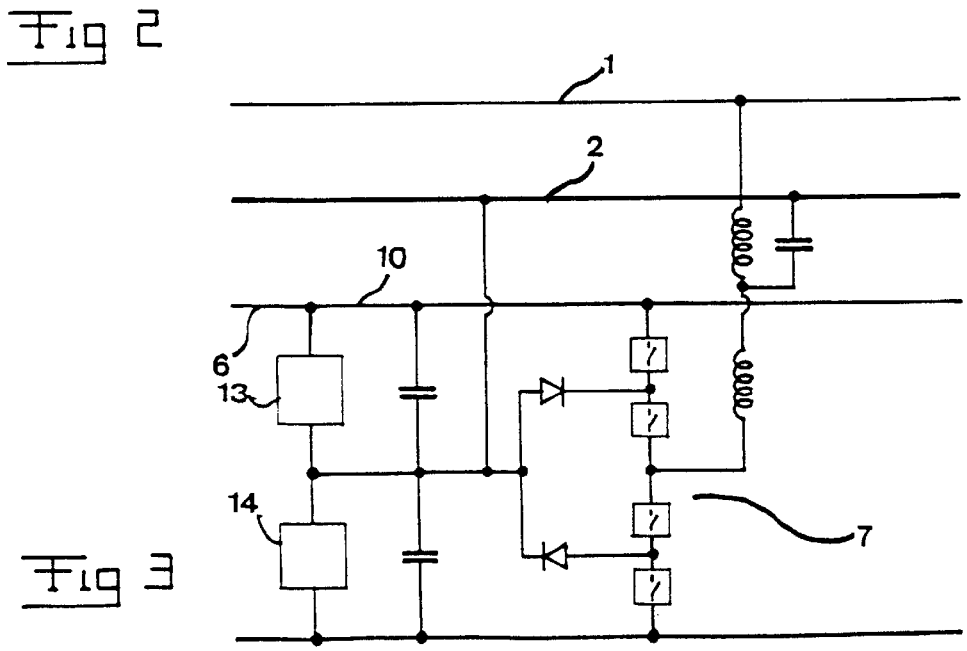
FIG. 3 is a part of a plant of the type shown in FIG. 1 according to a second preferred embodiment of the invention.

Another way to construct the inverter of a plant according to the invention is illustrated in FIG. 3, in which this here is designed as a so-called neutral point(NPC)-inverter having three levels. The design of such an inverter is conventional technique. The arrangement of an inverter of this type means that the voltage jumps to be taken by the inductor of the one-phase filter will be halved, which results in a better curve shape.

The invention is of course not in any way restricted to the preferred embodiments described above, but many possibilities to modifications thereof would be apparent to a man skilled in the art, without departing from the basic idea of the invention.

The number of inverters of the plant could for example be another than shown in the figures, and an inverter would usually be arranged in connection with the rectifier in a so-called converter station.

As already mentioned, the different alternating voltage lines could have another number of phases and other voltage levels and frequencies than mentioned above.

What is claimed is:

1. A plant for feeding alternating voltage between places remotely located through a long first line comprising:
   a feeding arrangement for feeding electric power to the first line, wherein said feeding arrangement includes
   a second line conducting direct voltage and adapted to extend along the first line, and
   a plurality of inverters arranged at locations along the extension of the lines and connected between the direct voltage line and the alternating voltage line,
   said plurality of inverters converting direct voltage into alternating voltage fed therethrough to the first line.

2. A plant according to claim 1, wherein the feeding arrangement further comprises:
   a third line conducting alternating voltage connected to the first line for feeding electric power to the first line, and
   a rectifier connected between the third line and the second line.

3. A plant according to claim 2, wherein the feeding arrangement further comprises:

a converter with a rectifier connected to the third line, an inverter connected to the first line, and an intermediate link arranged therebetween, wherein the second line is connected to the intermediate link to feed direct voltage along the first line.

4. A plant according to claim 3, wherein said inverter is arranged in a station close to the rectifier and is connected to the first line, and at least one additional inverter is connected between the first line and the second line at a substantial distance from said inverter connected to the first line.

5. A plant according to claim 1, wherein the first line is a contact line for feeding a one-phase alternating voltage to railway vehicles.

6. A plant according to claim 3, wherein the third line is a three-phase alternating voltage line.

7. A plant according to claim 6, wherein a transformer is arranged between the third line and said rectifier for step-down transforming the voltage, before rectifying thereof.

8. A plant according to claim 1, wherein said inverter has switches in the form of semiconductor components of a turn off type, and said plant further comprises a control arrangement for controlling the switches of the inverter and obtaining a pulse width modulation pattern.

9. A plant according to claim 1, wherein the connection between said inverter and the first line has no transformer.

10. A plant according to claim 9, wherein a filter with an inductor and a capacitor for eliminating harmonics is arranged in the connection between the inverter and the first line.

11. A plant according to claim 1, wherein the inverter is a three-level inverter having a neutral point.

12. A plant according to claim 2, wherein said inverter is adapted to convert said direct voltage into an alternating voltage of the first line with another frequency that a frequency of the alternating voltage of the third line.

* * * * *